(12) United States Patent
Ehrman et al.

(10) Patent No.: US 8,671,063 B2
(45) Date of Patent: Mar. 11, 2014

(54) SYSTEMS AND METHODS FOR REMOTE VEHICLE RENTAL WITH REMOTE VEHICLE ACCESS

(71) Applicant: I.D. Systems, Inc., Woodcliff Lake, NJ (US)

(72) Inventors: Kenneth S. Ehrman, Upper Saddle River, NJ (US); Michael L. Ehrman, Upper Saddle River, NJ (US); Jeffrey M. Jagid, Demarest, NJ (US); Nathan H. Loosmore, Seattle, WA (US)

(73) Assignee: I.D. Systems, Inc., Woodcliff Lake, NJ (US)

( * ) Notice: Subject to any disclaimer, the term of this patent is extended or adjusted under 35 U.S.C. 154(b) by 0 days.

(21) Appl. No.: 13/758,604

(22) Filed: Feb. 4, 2013

(65) Prior Publication Data

US 2013/0144667 A1    Jun. 6, 2013

Related U.S. Application Data

(60) Continuation of application No. 12/773,093, filed on May 4, 2010, now Pat. No. 8,370,268, which is a continuation of application No. 11/019,749, filed on Dec. 21, 2004, which is a division of application No. 09/804,909, filed on Mar. 13, 2001, now Pat. No. 6,898,493, which is a continuation-in-part of application No. 09/315,071, filed on May 19, 1999, now abandoned.

(51) Int. Cl.
*G06Q 10/00* (2012.01)
*G06Q 30/06* (2012.01)

(52) U.S. Cl.
CPC ................................ *G06Q 30/0645* (2013.01)
USPC ......................................................... 705/307

(58) Field of Classification Search
CPC .................................................... G06Q 10/087
USPC ...................... 705/22, 26, 28, 307; 701/213; 340/932.2; 364/401, 423.098
See application file for complete search history.

(56) References Cited

U.S. PATENT DOCUMENTS

| | | | | |
|---|---|---|---|---|
| 4,495,484 A | * | 1/1985 | Kawakatsu et al. | 340/457 |
| 5,289,369 A | * | 2/1994 | Hirshberg | 705/13 |
| 5,726,885 A | * | 3/1998 | Klein et al. | 455/456.6 |
| 5,812,070 A | * | 9/1998 | Tagami et al. | 340/932.2 |
| 6,240,365 B1 | * | 5/2001 | Bunn | 701/516 |

* cited by examiner

*Primary Examiner* — Ryan Zeender
*Assistant Examiner* — Hunter Wilder
(74) *Attorney, Agent, or Firm* — Troutman Sanders, LLP; James E. Schutz; Robert R. Elliott, Jr.

(57) ABSTRACT

An automated vehicle rental system with individual vehicle transmitting sensors for keeping track of vehicle mileage, fill state of vehicle fuel tank, and localized position status in a rental lot. Sensors are linked to the vehicle odometer reading and to the vehicle fuel tank float sensor with compensation for types of driving and fuel fill-ups which affect float level readings. The sensors are integrated with or are linked with communicating tags operable in a defined site for ultimate communication of stored vehicle related sensor data, vehicle location and type to a central data base for automatically completely effecting check out, charges and state of vehicle readiness for renewed rental. The transmitting sensors are adapted to avoid interference between sensors of other vehicles during multiple transmissions. Also included is an in-vehicle check out and payment device operatively linkable to the transmitting sensor of the vehicle.

5 Claims, 3 Drawing Sheets

SYSTEMS AND METHODS FOR REMOTE VEHICLE RENTAL WITH REMOTE VEHICLE ACCESS

CROSS-REFERENCE TO RELATED APPLICATIONS

This is application is a continuation claiming priority under 35 U.S.C. §120 to U.S. patent application Ser. No. 12/773,093, of the same title, filed May 4, 2012, which is a continuation claiming priority under 35 U.S.C. §120 to U.S. patent application Ser. No. 11/019,749, entitled "FULLY AUTOMATED VEHICLE RENTAL SYSTEM," filed Dec. 21, 2004, which is a divisional application claiming priority under 35 U.S.C. §121 to U.S. Pat. No. 6,898,493, entitled "FULLY AUTOMATED VEHICLE RENTAL SYSTEM," issued on May 24, 2005, which is a continuation-in-part application claiming priority under 35 U.S.C. §120 to U.S. application Ser. No. 09/315,071, entitled "FULLY AUTOMATED VEHICLE RENTAL SYSTEM," filed on May 19, 1999, which is not abandoned, all of which are incorporated by reference in their entirety as if fully set forth herein.

FIELD OF THE INVENTION

This invention relates to system and method for remotely renting a vehicle. In particular, this invention relates to a system and method for remotely enabling a user to gain entry/access to a rental vehicle.

BACKGROUND OF THE INVENTION

In the current state of the art, vehicle, and in particular automobile or car rentals require an initial check-in or rental procedure wherein the lessee provides personal and financial payment information (usually a credit card number and charge authorization) to the rental agency at a check-in counter. The information is then linked by computerized record to an available vehicle, using identification such as the vehicle license plate number, Vehicle Identification Number (VIN), and the like. Before each new rental the vehicle is inspected for current odometer reading and fuel level (with such information being entered in the computer database or its having already been previously entered with a prior return). This information is entered on a rental agreement and given to the customer and payment is effected, which, for individuals, is almost always with the tendering of a credit card.

The identified vehicle is located in the lot by the customer and then removed from the rental agency lot with a gate security check at a check-out gate, as assurance that the driver is in fact the authorized lessee or is otherwise authorized to remove the vehicle from the lot. Usually this is affected by comparison of driver identification with a rental agreement or just with the rental agreement information.

Thereafter the vehicle is driven and eventually returned to a rental agency lot (the origination lot or another lot of the same rental agency in a different location when such type of return is authorized) and the lessee advises the agency of such return.

Prior to completion of the check-out, an employee of the rental agency is dispatched to physically inspect the vehicle and to check the mileage (many rental agreements are dependent on mileage) and fuel level (the usual agreement specifies that returns are to have a full tank, and if not, an additional fuel charge is applied). In some instances the results are entered into a hand held computerized recordation device for entry into the agency computer database for calculation of the final rental charge (either while the lessee waits or as a supplement to the original charge on the initially tendered credit card).

In other instances the information is collected from the vehicle and is manually entered into a computer database for calculation of the final charges.

The present system has several shortcomings, foremost of which is the need for a physical inspection of each returning vehicle for recordation of mileage and fuel level, by a rental agency employee (at peak return periods, check-out times can be lengthy). In addition, recordation of fuel level is inexact and may vary from vehicle to vehicle since a fuel level gauge is only a rough indication of fuel level and actual level may vary by as much as a gallon or two and a customer is not charged or credited with the appropriate fuel usage charges. Other shortcomings include wasted time by both the customer and rental agent employees in either or both of the rental and return procedures. In addition, there is only a rudimentary estimate regarding readiness of vehicles and vehicle types available for rental. An additional shortcoming is the errors introduced by humans who read the fuel gauge (different viewing angles can provide different readings) and odometer (mid-point readings may be erroneously interpreted) as well as errors during manual data entry into a hand-held computer.

There is also currently no viable method other than a manual one for determining location of specific vehicles in a rental location or the states of readiness of such vehicles for rental. Furthermore, security of vehicles with correlation between specific vehicle and authorized user is subject to break-down with current methods of security.

An example of a typical prior art system is one disclosed in U.S. Pat. No. 5,058,044 which discloses a system for returns of rental vehicles. The described system relies on a physical annunciation of the arrival of the return car somewhat akin to activating a trip wire in order to initiate operation of the system at every location. However, because of the necessity of an annunciator for operation there are numerous limitations: In the described system, a returned car must proceed to a specific return area modified with the annunciator and local computerized system. Because of such limitations, returns take longer to be processed and the system requires a local processor to close out a transaction. In addition the system has no effective way of preventing RF interference between simultaneous returns.

Another representative patent in the field is U.S. Pat. No. 5,289,369 which discloses a central control designed primarily to provide a roving fleet of rental cars throughout a city, with location and constant monitoring by central site being key elements. This system requires key access by mag card to enter a vehicle as well as individual on-board computers in each vehicle.

U.S. Pat. No. 6,006,148 discloses an automated vehicle return system, wherein vehicles are provided with monitoring circuitry for monitoring parameters such as fuel level in a rental automobile. In addition the automobile is provided with a transmitter to transmit data regarding the vehicle and its rental to a base station within a vehicle return zone and thereafter the data is transmitted to a host computer. However, the system disclosed therein makes no provision for the operative function of multiple vehicles transmitting simultaneously to the same base station or host computer, with interference and false or missed readings engendered thereby. In addition, while absolute values of fuel tank contents are obtainable, factors, such as fuel float sensor position which often contribute to false readings are not always compensated for. Finally this patent is representative of patents in the field wherein only rudimentary information regarding automobile condition is monitored and transmitted. There are no provisions for security correlation, vehicle location within a rental site, or state of readiness of a vehicle for rental as well as automation of the rental process.

SUMMARY OF THE INVENTION

It is therefore an object of the present invention to provide a fully automated vehicle rental and return system (both check-in and check-out) which system includes, in every rental vehicle, a medium range (generally up to about 500 feet radius, sufficient to entirely encompass the area of a rental lot and even an arrival area outside the lot) transmitter/receiver device with memory storage means for receiving and transmitting information regarding the car rental and sensors for accurate and continuous measurement and storage of odometer reading and fuel tank levels and is able to remotely provide such information to a central billing data base without interfering with transmission from other vehicles or being interfered with by transmissions from other vehicles.

It is a further object of the present invention to provide rental lot fixed location node sensors whereby location of a vehicle (and concomitant state of renewed rental readiness) in the lot is constantly updated at a central tracking and billing data base.

It is yet another object of the present invention to provide the sensors and transmitter/receiver device with vehicle and driver (renter) identification (and initial mileage and fuel level) to effect high level security on removal and return of the vehicle to the lot. In addition, it is an object to accurately calculate final rental charges and to personalize messages to the vehicle renter upon leaving and returning to the lot on a visible display, wherein fuel fill-ups are correlated with vehicle speed, deviations of the vehicle from horizontal (which affects fuel float readings), vehicle fill-ups and vehicle mpg values to provide fuel condition values independent of any fuel float or its position. The system can log the fuel level on checkout (rental) for comparison with check-in for use in fairly calculating the customers' charges.

Generally the present invention comprises a vehicle rental system wherein each vehicle comprises a unique vehicle identifier, and wherein the vehicle is provided with remote communication transmitter/receiver means capable of communicating with one another as well as with a central data base, with said vehicle identifier being initially stored in memory means linked to the communication transmitter/receiver means and with memory storage of transmitted information specific to the rental (driver identification, and optionally credit card information, term of the agreement, etc.). The vehicle further comprises odometer reading sensor means linked to an odometer of the vehicle and to the communication transmitter/receiver means and memory means (RAM) for the continuous storage of odometer readings of the vehicle mileage and for the remote transmission thereof to a data collection or central billing data base when the vehicle is returned. As used herein the term "central data base" or "data base" refers to a central storage of rental profiles, rental information and prints receipts. Because the VAC (vehicle computer) stores all of the critical parameters of the rental agreement, the VAC data can be used to close out rental transactions when the system is down. The vehicle further comprises fuel sensor means linked to the vehicle's float sensor normally used for gauging fuel level in a vehicle's fuel tank. In order to check validity of float sensor reading (a float sensor is subject to vagaries of non-level road, fuel tank filling, etc.) fuel sensor means further comprises analysis means for interpreting factors relevant to the meaning of a particular float level at a particular time and usage. Float sensor data are also transmitted to and stored in the RAM memory means for later transmission retrieval. In a preferred embodiment the fuel sensor means and the odometer reading sensor are linked with operational software to provide vehicle mileage (mpg) history and history of mileage since last fill-up for use in automatically determining whether the customer filled up and to provide a buffer of free fuel for which the customer will not be charged (e.g., no charge for fuel if customer filled up within 20 miles of the rental return site). In accordance with the present invention the various tags attached to the vehicles and fixed position nodes situated throughout the lot communicate with each other in identifying vehicles and salient rental, vehicle and driver information over the transmission range, without intermediate need for a central computer except as an ultimate billing information repository. Because of their interaction and intercommunication the tags permit only single vehicle communication at a time, thereby preventing cross talk and possibly incorrect information being transmitted for a particular vehicle. In addition, messages between tags are prioritized by type such that a check-in message is more important than a location movement message. In addition, devices in the individual cars can communicate via other devices in other cars if necessary if there is undue RF interference and message blocking.

Other connections from the transceiver/receiver device to car functions (unrelated to direct billing information) may be effected such as with oil pressure and water temperature sensors and actuators such as door locks and ignition. For an overall function control, the transmitter/receiver device of the present invention may be also be operationally connected to the computer bus system of the vehicle, whereby inquiries may be directly made to the on-board vehicle computer regarding fuel, odometer and the like readings. For connection to bus systems which differ from vehicle to vehicle and manufacturer to manufacturer, software must be provided to the devices to determine the particular "language" it is to be speaking. Ultimately the device may be provided with or linked to impact sensors to help report on damage while with a particular driver.

The above and other objects features and advantages of the present invention will become more evident from the following discussion and drawings in which:

BRIEF DESCRIPTION OF THE DRAWINGS

FIG. 3 is a schematic view of a welcoming sign arrangement with information for a specific driver relating to check-in.

DETAILED DESCRIPTION OF THE INVENTION

Figure 1:
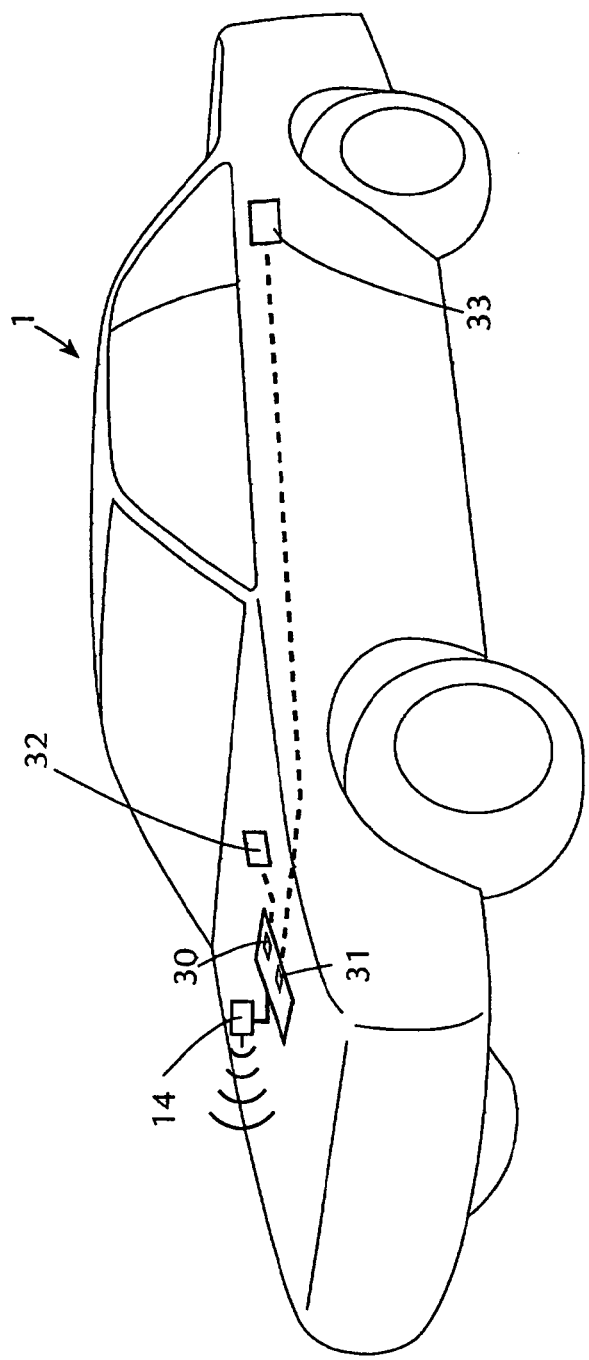
FIG. 1 is a see-through view of a typical rental automobile showing placement of odometer and float sensors and communication transmitter/receiver, in accordance with the present invention.

In accordance with the present invention, and in a preferred embodiment, the unique vehicle VIN is used to identify an automobile, its make, model and type and is preferably used as a key identifier thereof. The VIN is programmed into the memory chip associated with an RF transmitter/receiver device placed within the vehicle (since radio frequency is used for transmission the device can be operably hidden anywhere in the car out of sight and reach of the driver). Useful transmitter and receiver devices with related memory storage are embodied in the tag and lode system described in U.S. Pat. No. 5,682,142, by the inventors herein, the disclosure therein is incorporated herein by reference thereto. The transmitter/receiver devices are smart devices with inquiry functions and communication with each other and with fixed position nodes (FPN) whereby they do not interfere with each other in simultaneous transmission of data such as with return of several vehicles at one time. The devices comprise, as described in said patent, microprocessors, combined into one integrated circuit which are available and specifically include the Neuron RTM 3150 integrated circuit, manufactured by Motorola and Toshiba, which is preferred for use in each tag node and FPN. In these integrated circuits, a first microprocessor handles a media access algorithm (predictive p-persistent CSMA). A second microprocessor handles the application code. A final microprocessor handles network variable processing and network management.

The devices are readily removed and placed into other vehicles with reprogramming of new vehicle type (in preferred embodiments, the devices have overall vehicle information in RAM or NVRAM (non-volatile battery backed RAM) and a simple vehicle identification recalls it for immediate use). The system described therein operates with a network of stationary nodes and non-stationary communication tags attached to items, to provide a decision making communication network without a central processing computer (any computer used functions to tap into the communications) for functions such as constant location of any of the tagged items when within communication range (direct and relayed).

In addition to the transmitter/receiver with associated memory, at least two sensors are integrated into each rental vehicle, the first being a direct monitoring sensor of odometer reading which is preferably coupled with a timer and/or the vehicle speedometer to maintain continuous readings of vehicle speed. The second sensor is linked to the float used to monitor fuel levels and either (depending on the vehicle) directly stores digital output data of fuel level or effects an analog to digital conversions with the use of imbedded translation table software (unique to the particular vehicle as determined from the VIN) to provide actual units of fuel level. The fuel level sensor is programmed to recognize fill up conditions of float level change (i.e. float level rising at vehicle idle without vehicle movement) as well as up or downhill travel (with concomitant displacement of float level) as correlated with vehicle speed and calculated mileage. This contrasts with prior systems which simply determine float position without evaluation of actual car usage, fill-ups, and deviations from level such as on uphill ramps in a vehicle return garage which, if uncompensated for, provide incorrect fuel level readings.

With the system of the present invention, car check in and check out are automatically effected by direct communication between the car and the central rental agency data base. Thus, in a typical rental transaction, a prospective customer (in person, by phone or by Internet access, etc.) specifies the type of car desired. When a reservation is confirmed, such as when a renter arrives at a facility, this is entered into the data base which makes inquiry to various stationary nodes located in the rental lot and tags (transmitter/receivers with memory) in each of the vehicles to receive appropriate vehicle information of which vehicles of the type desired are in condition for rental at the desired rental time. This information is automatically communicated from the automobiles to the data base for advising the customer regarding rental options.

During a rental transaction, details of the driver and other possible authorized users, such as licensing information and optionally including credit card information, as well as type of rental agreement, are remotely transmitted to the vehicle to link the VIN with the driver et al. and parameters to be monitored. The transmitter/receiver with associated memory, appropriately starts the digital registers of starting odometer reading and exact fuel level and transmits information to a security gate relating to the driver-automobile linkage (the data base may initially provide such transmitted information to the security gate). Preferably as the vehicle approaches the security gate it communicates with a terminal therein of the approach and the identity of an authorized driver. A simple visual correlation between actual identification and the screen information serves to clear a driver and vehicle for exit from the lot. In addition, the system checks for an open rental for the specific vehicle thereby preventing the stealing of vehicles with false paperwork, which is the only item currently checked, for permitting a vehicle to leave the lot.

During the rental period, car functions (odometer, mileage, fuel consumption, etc.) are constantly monitored with the appropriate sensors, and stored for retrieval as described above.

When the vehicle is returned to a rental lot (even one from which it did not originate but in which the central data base therein is operationally linked to the original data base computer—i.e., with pre-arranged remote vehicle drop-off) and comes within transmission range from outside of the rental lot, the transmitter/receiver within the vehicle transmits the stored information of odometer reading, fuel level, the correlation identification of car and driver and the exact time of return. No annunciator type devices, as in the prior art are used or are even necessary. Optionally, a personalized "Welcome Back" is activated to greet the driver by name and a rental agency employee (e.g., concierge), inspects the vehicle for damage and hands over a completed final receipt (with all charges and credits), which is calculated and printed while the driver approaches the lot. There is no manual log in and the vehicle actually checks itself in. The central data base, with all available billing and identification information, processes the charges and transmits advice to the transmitter/receiver to remove (or archives for possible future charges resulting from later detected misuse) the correlation between driver and vehicle. The receipt for the vehicle rental charges is automatically printed upon return of the vehicle (and prior to the driver exiting from the vehicle) whereupon the driver is given the receipt by a concierge to complete the entire rental transaction. The driver simply leaves the vehicle wits the keys and walks or is transported away to a desired destination. Aside from the hanging of the various nodes and modules, no construction or modification is required of the existing rental facility such as special lanes and the like.

With the close of the transaction, the vehicle is then moved, during the ordinary course of processing to various stations in the lot, such as from return area to car wash to parking lot to ready-for-rental site (also shop and fueling if necessary), determine staffing requirements, etc. with the central data base being constantly advised of real time location and thus readiness of the vehicle for re-rental (i.e. automated inventory control). The VIN of a vehicle is correlated to vehicle type, whereby vehicles can be located, using the VIN parameters, in the lot, both en masse and individually, with a variety of parameters. If desired a graphic display of the lot and real-time location and status is available at the rental data base with, for example, color coding (and detailed information) of vehicles such as mid-size, compacts, sedan, four door, manufacturer model, etc.). Knowledge of vehicle status enables the rental agency to prioritize handling to increase rental yield and to optimize lot efficiencies, e.g., evaluating how long a car stays in the car wash area before being put into the ready line, etc.

With the above system there is also provision for anomalies and the keeping track thereof of vehicles leaving the lot but involving non-rental transaction, such as permitted (or even non-permitted) employee use of vehicles (this is readily detected as being a situation when a driver is not linked to a VIN and the vehicle is removed from the lot). Alternatively, this can provide a security warning of unauthorized vehicle use and possible theft or simply an early warning that a vehicle in a ready area is not in fact ready, i.e., without a full gas tank in a preferred totally automated embodiment, in addition to the elimination of a check out counter, the function of a check-in counter is also eliminated by providing each vehicle with fully contained check-in and check-out means. In such embodiment, a keyboard (and associated screen) linked to the transmitter/receiver and a credit card reader is located within each vehicle. The customer enters a selected vehicle, punches in the prompted rental (e.g., rental duration, fuel option, insurance coverage option, return option, etc.) and identification information and, when instructed, swipes a credit card through the reader to activate the system, with transmission of all the information to the central billing and maintenance data base which transmits details to the check-out gate, where a rental agreement is printed out, when the vehicle arrives at the gate. In lieu of a keyboard with manual entry, where applicable and available, identification information may be scanned in such as with OCR hardware and software or with scanning means such as bar code readers (if the identification is bar encoded).

In accordance with the present invention, in a preferred embodiment there is a backup battery scheme which stores the fuel/odometer translation tables (information used in calculating fuel level and vehicle traveling operation for specific vehicles), odometer reading (ongoing), critical car information, rate information, driver information etc. As a result of use of translation tables (wherein data is stored for a variety of vehicle operation parameters), the device can be moved from car to car, eliminating the need for unique versions. All that is needed is a reprogramming of the device to reconfigure itself with stored parameters to the specific vehicle to which it is being transferred or attached.

In order to reduce costs (and make it effective for widespread deployment), the present invention utilizes a low cost, intelligent tag to calculate fuel level accurately, over time, without need for central processing data bases. This allows for decisions, such as open gate, to be made without a central processing data base and eliminates need for a local computer for such purposes.

The specific transmitter/receiver devices and fixed position nodes are smart enough to know when to transmit, thereby reducing the amount of transmissions in the air and the resulting infrastructure costs such as the annunciators used in the prior art. Preferably all links are made directly to the sensors, enabling installation/removal time to be no more than about 15 minutes for change between vehicles.

As a result of RF transmissions being utilized for communication, there is no necessity for direct sight line for communication (such as with transmitters as used in toll activation devices requiring windshield placement). The devices can be mounted anywhere in the vehicle, thereby reducing installation/removal time and increasing security. The devices are of a small size (4.times.4.times.2") allowing for ease in hidden placement in the vehicle.

In preferred embodiments the devices are installed to directly tap insignificant amounts of power from the vehicle battery, thereby eliminating need for separate battery powering of the device, thereby increasing reliability, lowering bulk, reducing cost and reducing the need for changing dead batteries.

In accordance with the present invention the transmitter/receivers also communicate between vehicles if necessary to ensure communication (e.g. cars can act as repeaters to reach an interrogator) and to prevent erroneous communication overlap from different vehicles entering a lot at the same time.

With reference to the drawings, in FIG. 1, rental vehicle 1 contains monitoring sensors 30 and 31 operatively linked to the vehicle odometer 32 and fuel tank float 33 and which sensors are respectively linked to the device 14 for use in transmission of monitored and stored information to a central data base and for resetting of digital registers to initial usage conditions of mileage and extent of fuel capacity. During rental use, the sensors, as programmed, monitor odometer readings, mileage and fuel usage (as described above) and the data is entered and stored in the memory associated with transmitter/receiver 14.

Figure 2:
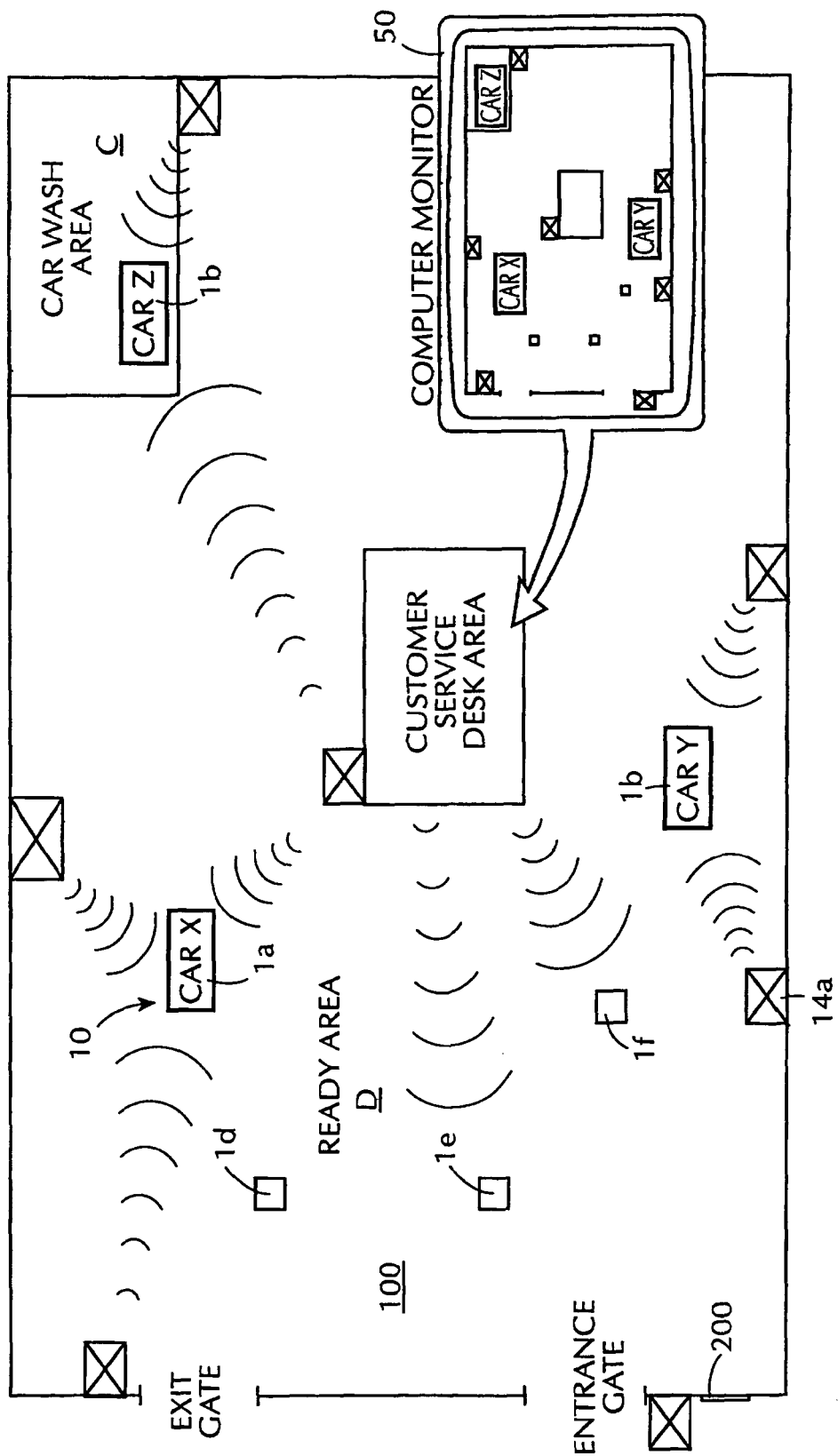
FIG. 2 is a schematic view of a typical auto rental car lot with various location stations and showing the transmitted location of a specific car (or car type) in real time and with marked off positions of typical fixed node locations.

In FIG. 2, a vehicle rental lot is shown with real time location of vehicles 1a-f therein which are individually tracked and monitored by a device 14 contained in each of the vehicles. A customer views the screen 50 (depicting the lot) or is assisted in selecting a desired vehicle 10 which is ready for rental and its location within the lot 100.

Figure 4:
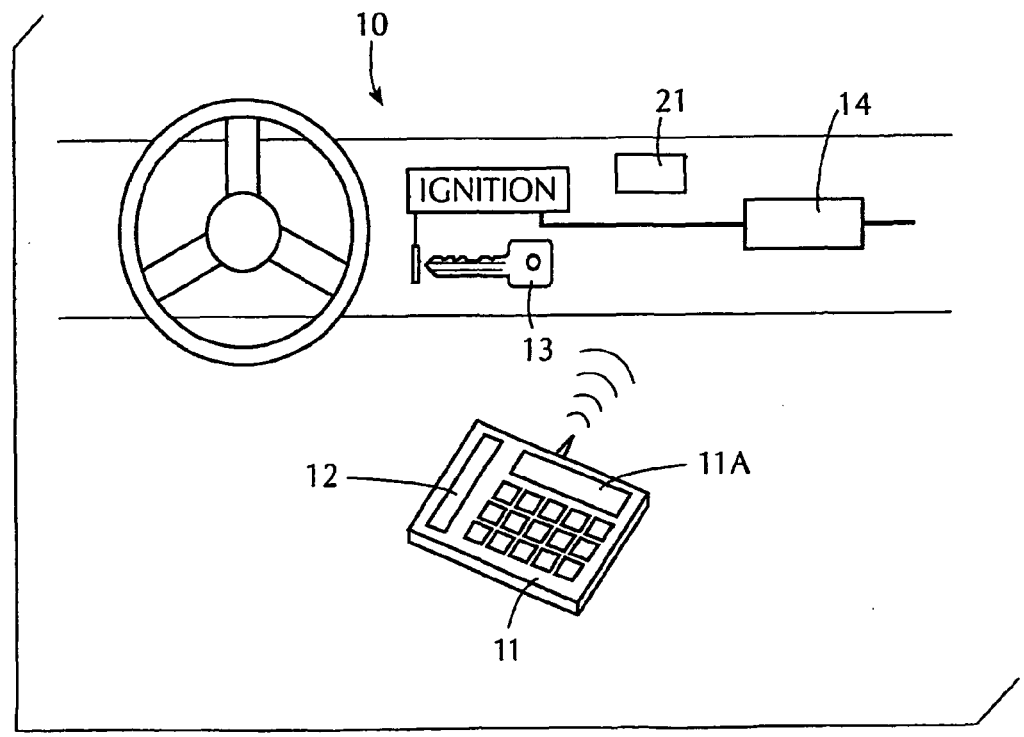
FIG. 4 is an interior view of a further embodiment of the automobile of FIG. 1, equipped with on-board rental and check in devices operatively associated with the communication transmitter/receiver.

In FIG. 4, rental vehicle 10 is shown situated in vehicle rental lot 100 in rental ready area A. The vehicle 10 includes a data entry keyboard 11 and screen 11a for direct entry by a customer of identification and rental information options, whereby the customer simply locates the vehicle and effects check-in directly within the vehicle. After data entry (the information typically required in filling out a rental agreement-optionally all such data may be contained in a preprogrammed card for simple swipe entry in a reader such as for frequent users), the customer swipes a credit card through reader 12 for activation of the rental process including activation of the vehicle starting key 13 (left in the vehicle but which cannot start the vehicle unless an interlock is activated). Device 14 transmits the customer-entered information, including credit card information, to a central billing and control data base. The device 14, further transmits pre-entered vehicle identification information (such as VIN 20 contained on a dashboard 21 for visual identification), for direct correlation with the customer entered information for use as a security key and for subsequent billing and vehicle inventory control. It is device 14 which further functions as a vehicle locator and tracker within lot 100 by means of communication with fixed position nodes 14a dispersed within the lot. The central data base and/or device 14 transmits a valid activation with vehicle and customer information to a check-out gate where identification is checked on a terminal to ensure that an authorized user is removing the vehicle from the vehicle lot. Device 14 transmits an approach message which triggers a printer at a check-out gate to print out a rental agreement for the driver with the previously entered information and selected options. It is possible to utilize separate devices 14 for the separate purposes of driver and vehicle identification and function monitoring, with the former device being removable for transfer to another vehicle once valid identification has been established, such as at a check-out gate.

Figure 3:
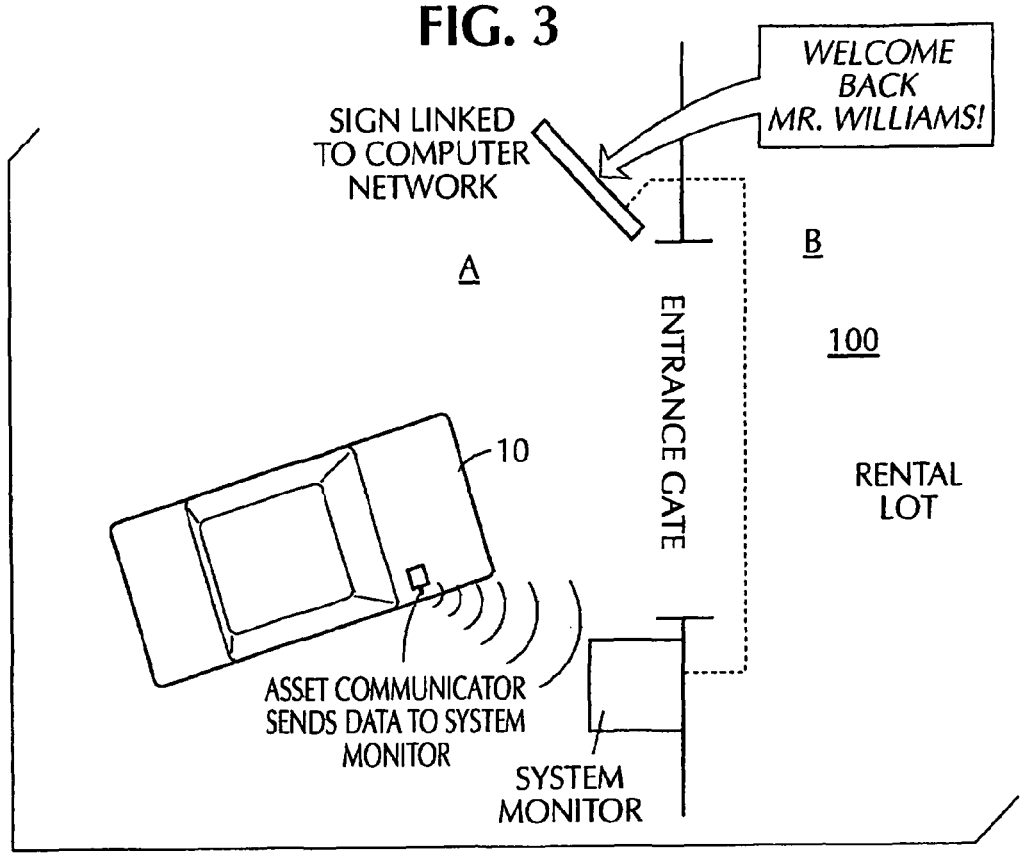

When the vehicle is returned to lot 100 (or other computer linked lot) a personalized welcome back sign 200 (FIG. 3) is activated, device 14 transmits the memory stored information relating to fuel fill status (as well as mileage and other usage information) to the billing data base, which calculates the final bill, charges the previously activated credit card charge, and prints out a receipt for the payment with itemized charges at the check in gate. The customer takes the receipt (or is handed the receipt by a concierge) and simply leaves the vehicle in drop-off section B of lot 100. Device 14 immediately transmits this location information to the central data base for inventory control and processing for re-rental with device 14 maintaining location communication with the central data base during car washing (area C) and ready area D, etc. Device 14 is powered by the vehicle battery and maintains sufficient power for such constant location communication.

It is understood that the above Example and discussion are exemplary of the present invention and that changes in operative procedure and components and the like are possible without departing from the scope of the present invention as defined in the following claims.

The invention claimed is:

1. A method for renting a vehicle, the method comprising:
receiving a request for reservation at a central control system from a user's device for a desired rental vehicle type and a desired rental time;
sending an inquiry from the central control system to a plurality of on-board devices in a plurality of rental vehicles in response to the request;
automatically communicating data from the plurality of on-board devices in the plurality of rental vehicles of the desired vehicle type to the central control system in response to the inquiry;
determining an availability of each of the plurality of rental vehicles based on the communicated data and the desired rental time;
displaying to a user one or more rental vehicle options and the one or more rental vehicle options' locations based on the determined availability of each of the plurality of rental vehicles;
activating an interlock after activation of a rental agreement from a device within one of the one or more rental vehicle options selected by the user.

2. The method of claim 1, wherein the data from the plurality of on-board devices in the plurality of rental vehicles comprises one or more selected from the group consisting of fuel level, battery voltage, location, and door lock status.

3. The method of claim 1, wherein determining the availability of each of the plurality of rental vehicles further comprises: determining that a fuel level of one of the plurality of rental vehicles is above a predetermined threshold.

4. The method of claim 1, wherein determining the availability of each of the plurality of rental vehicles further comprises: determining a respective location of each of the plurality of rental vehicles.

5. The method of claim 1, wherein each of the plurality of rental vehicles are determined to be available if a respective rental vehicle is in a predetermined location; and each of the plurality of rental vehicles is determined to be unavailable if a respective rental vehicle is not in the predetermined location.

* * * * *